Figure 1:
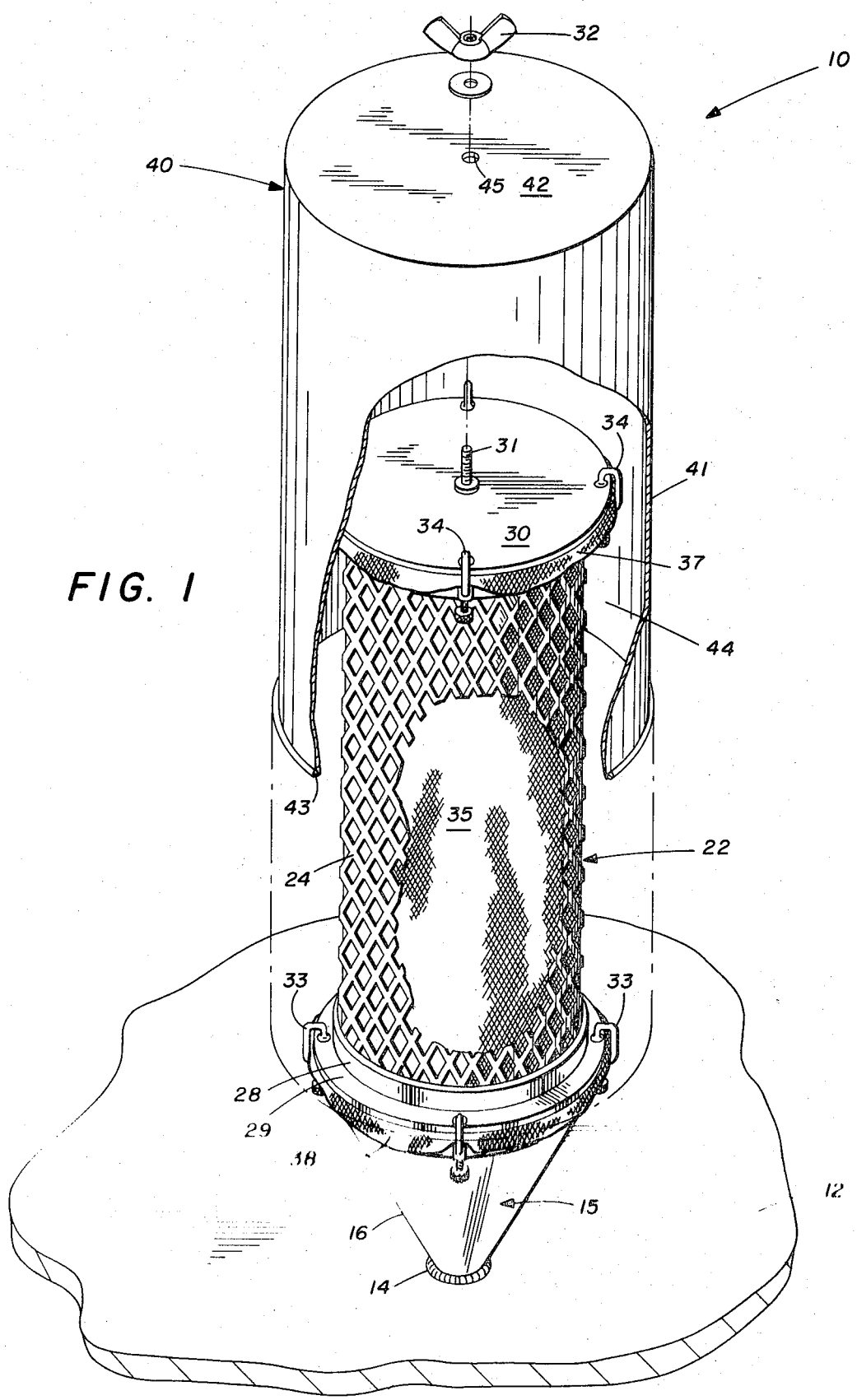

United States Patent [19]
Cox

[11] 3,832,833
[45] Sept. 3, 1974

[54] DUST COLLECTOR

[75] Inventor: Edgar Russell Cox, Smithfield, Tex.

[73] Assignee: Texas Industries, Inc., Dallas, Tex.

[22] Filed: Dec. 26, 1972

[21] Appl. No.: 318,554

[52] U.S. Cl.......................... 55/378, 55/385, 55/500
[51] Int. Cl............................................. B01d 46/04
[58] Field of Search...55/361, 362, 365, 366, 367, 55/373, 374, 341, 378, 498, 500, 502–505, 511, 385; 210/451, 485

[56] References Cited
UNITED STATES PATENTS

| | | | |
|---|---|---|---|
| 1,619,954 | 3/1927 | Olmstead et al...................... | 55/373 |
| 2,100,951 | 11/1937 | Glass et al. .......................... | 210/485 |
| 2,612,236 | 9/1952 | Uedder................................ | 55/378 |
| 2,851,164 | 9/1958 | Morino............................... | 210/485 |
| 3,287,886 | 11/1966 | Tiberi.................................. | 55/502 |
| 3,535,852 | 11/1970 | Hirs..................................... | 55/379 |

FOREIGN PATENTS OR APPLICATIONS 1,210,328  9/1958  France................................. 55/373

Primary Examiner—Bernard Nozick
Assistant Examiner—David L. Lacey
Attorney, Agent, or Firm—Richards, Harris & Medlock

[57] ABSTRACT

A dust collector for venting bins for storage of pulverulent materials such as cement silos is disclosed. The dust collector has an inlet adapted to be secured to the bin which carries a foraminous bag support. The bag support internally houses a filter bag. The bag is removably secured at its top and bottom to the support. A weather shield covers the filter structure to substantially prevent rain and moisture from entering the silo through the filter. The support prevents the filter bag from bursting by restraining the bag against overexpansion. The support structure also cooperates to clean the bag as the bag flexes against the support due to pressurization and contacts the support to shake loose clogging material.

4 Claims, 2 Drawing Figures

PATENTED SEP 3 1974

3,832,833

DUST COLLECTOR

The present invention relates to a dust collector for powdery or pulverulent material and more particularly relates to a dust collector to be used with silos or storage bins for cement.

Powdery or pulverulent materials such as cement, silica flour, flour, chemicals and the like are often stored in bulk in large bins or silos. Conventional means of loading and unloading storage bins or silos include pneumatic conveying systems, which when operated to fill the bins, inject large volumes of pressurized air into the storage bins. Some provision must be made for releasing or otherwise venting air from the tank to prevent buildup of excessive internal pressures which can be hazardous and damaging to the silo structure. It is known to provide one or more air vents in the silo or bin to prevent pressure buildup. Typically these vents include a filter element to prevent discharge of dust into the atmosphere. Commonly, the filter elements consist of one or more filter bags secured about an opening in the silo which entrain dust in the vented air flow.

Several problems exist with the prior art dust collectors utilizing conventional filter bag arrangements. It is not uncommon, because of careless unloading procedures or use of excessive pressure, to overpressurize a filter bag causing it to burst. The bursting of a bag is highly undesirable in that it will permit the discharge of powdery pollutants into the atmosphere, often in violation of local clean air ordinances. Such discharge can result in substantial economic loss to the silo operator.

A further problem inherent in the use of conventional filter bag arrangements in venting systems, is the maintenance required in cleaning or periodically replacing the bags. Over a period of use, depending upon such factors as atmospheric conditions and the characteristics of the powder or particulate materal being stored, frequent cleaning and replacement of the filter bags is required. During use the bags become clogged and ineffective for their intended purpose, that is, the effective venting of uncontaminated pressurized air from the silos or bins. Cleaning of the bags may be done by physically shaking the bags or in more sophisticated systems may be accomplished by various expensive and complicated systems using wave generators or other types of vibrators.

The foregoing clearly demonstrates that there exists a need for a simple dust collection system for silos and bins which is reliable and is resistive to bursting even at high pressures. It is also apparent that a filter bag which is self-cleaning through use would also be highly desirable. The present invention provides such a dust collection bag.

Figure 2:
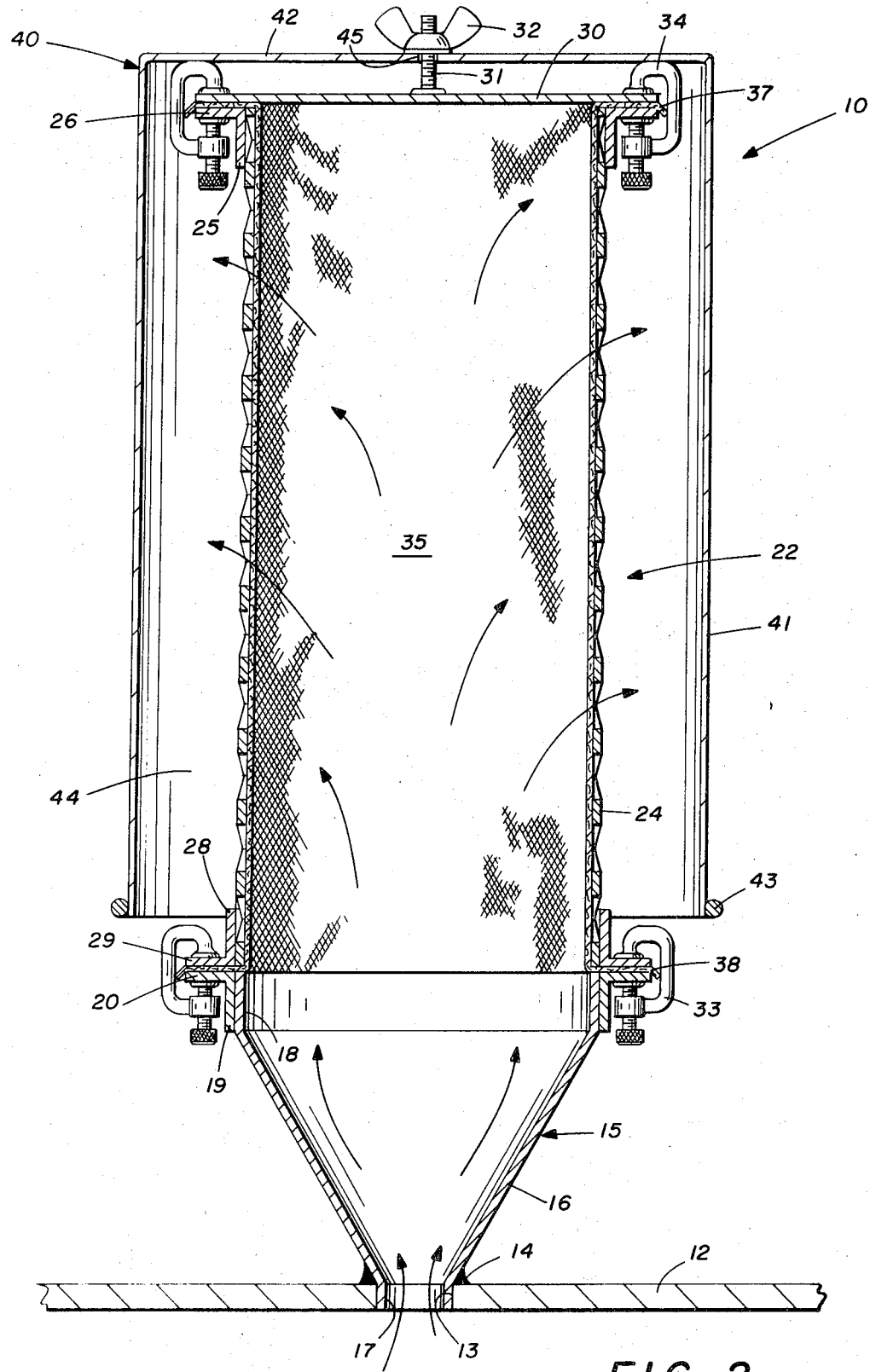

The dust collector of the present invention includes a filter section having a generally cylindrical foraminous supporting structure which contains a filter bag of a conventional filter material such as a woven nylon or a canvass. The filter section is partially enclosed in a cover or rain hood device. The air flow entering the bottom of the dust collector proceeds through the filter bag and out the foraminous supporting structure to be discharged at an annular opening at the bottom of the cover or hood. The filter bag supporting structure serves to contain the bag against overexpansion and subsequent bursting due to internal pressurization of the bag. The natural operational flexure of the bag against the supporting structure serves to perform a self-cleaning function during use. The fine particles of material contained within the weave of the bag are caused to at least partially shake loose and fall by gravity to the subjacent silo bin. Other advantages and features of the dust collector of the present invention will become apparent from the following description and drawings, in which:

FIG. 1 is the perspective view, partly broken away, of the dust collector of the present invention shown mounted on a conventional cement silo; and FIG. 2 is a vertical cross-sectional view of the dust collector shown in FIG. 1.

Referring now to the drawings, the numeral 10 generally represents the dust collector of the present invention. The dust collector is shown positioned on a storage bin or silo having a generally horizontal roof section 12 constructed of steel. The dust collector broadly includes inlet section 15, filter section 22, and weather shield 40.

The inlet of the dust collector is generally designated by the numeral 15 and includes frusto-conical section 16 having circular inlet opening 17 at the lower end. The upper end of inlet section 16 terminates at circular flanged section 18. Annular rim 19 is affixed to the periphery of section 18 having an outwardly extending flange member 20. Rim 19 for convenience is shown as a standard structural angle.

Filter section 22 includes cylindrical foraminous support member 24. Support member 24 is shown as being formed of an expanded metal but could be a wire screen or similar material having adequate voids to allow relatively unrestricted passage of air through the structure. Peripherally extending around the upper end of cylindrical support member 24 is skirt or rim 25. Rim 25 is shown as an angle having horizontally projecting flange member 26. Similarly, the lower end of cylindrical structure member 24 is provided with a skirt or rim 28 having lower horizontal flange member 29 extending outwardly at the lower edge of member 24. The diameter of lower flange member 29 corresponds to the diameter of flange 20 of rim 19 on inlet section 15. The rims 25 and 28 are preferably welded to the support structure 24.

A circular cover plate 30 rests on upper rim 25 and corresponds in diameter to the diameter of flange 26. Centrally positioned on cover plate 30 is a bolt 31 secured with the bolt head welded to cover 30 and the threaded end projecting upwardly. A wing nut 32 cooperates with the threads of bolt 31 to secure the rain cover to the filter section 22. A washer may be provided between the wing nut 32 and cover 30.

Cover 30, filter section 22, and inlet section 15 are all removably connected by upper and lower C-clamps 34 and 33, respectively, which facilitate replacement of the internal filter bag 35. Filter bag 35 is generally cylindrical and approximately corresponds in diameter to the internal diameter of cylindrical support section 24. Bag 35, as is known in the art, is preferably of a woven porous material such as a nylon or canvass cloth. The upper edge 37 of bag 35 is clamped between cover plate 30 and flange 26 of upper rim 25 and held in place by releasable C-clamps 34 engaging the rim and cover plate 30. Similarly, the lower edge 38 of bag 35 extends between lower rim flanges 20 and 29 on the filter and inlet sections respectively and is secured by clamps 33.

Protection of the filter section and silo interior from the environment is provided by a weather shield 40. Shield 40 has a generally cylindrical hood section 41 enclosed at one end by cover plate 42. The interior of cover plate 42 rests on C-clamps 34. As mentioned above, shield 40 is held in place by a wing nut 32 which is threaded on bolt 31 which projects through mounting hole 45 in cover plate 42. The lower end 43 of the rain hood is open. The diameter of body section 41 substantially exceeds the diameter of filter section 22. Body section 41 of weather shield 40 extends axially terminating at lower edge 43 approximately coincident with lower rim 28. Annular discharge opening 44 is defined at the bottom end of the cover with the filter section 22.

The present invention will be better understood from the following description of installation and operation of the dust collector unit 10.

Inlet section 16 is positioned with circular opening 17 in vent hole 13 in the roof section 12 of a silo. A continuous weld 14 is placed at the juncture of the inlet section 16 and roof 12. It will be noted that inlet section 16 could be generally cylindrical, however the inverted conical shape is preferred in that such construction requires a smaller hole in the silo roof 12 and also minimizes the length of the weld 14 required to secure the dust collector to the roof. Once the inlet section is in place, the filter section 22 including the enclosed filter bag 35 can be installed. This is done by placing the filter bag 35 within cylindrical support 24. The upper and lower edges 37 and 38 of the filter bag are stretched to lap over the upper and lower rim flanges 26 and 29 of the support. Filter section 22 is positioned with flange 29 resting on flange 20 of the inlet. Cover member 30 is placed in position on upper flange 26. The filter section 22 is then removably secured to the inlet section 16 and cover 30 by the expedient of removable clamps 33 and 34. The number of C-clamps may vary with the particular installation; typically as many as 20 clamps may be required at opposite ends of the filter sections. Weather shield 40 is inverted and placed in position with the interior of cover 30 resting on the upper edge of C-clamps 34 and secured in place with wing nut 32. The unit is now completely assembled and ready for use. During normal pneumatic unloading operations into the silo, back pressure from residual compressed air is created within the silo. The excess air pressure is allowed to vent dust laden air entering the device 10 at opening 17 and flowing through the filter bag 35 and the openings in the cylindrical section 24. The filtered air is discharged from the unit at annular space 44 defined between the interior of weather shield 40 and the cylindrical exterior of member 24. The discharge is relatively free of particulate material and other pollutants which are trapped by the filter bag 35.

Should excessive pressure be built-up within the silo, the filter bag 35 is restrained by member 24 from expanding to such a degree to cause the bag to burst. This is in contrast to prior art devices in which the bag is unsupported and therefore allowed to freely expand with air pressure to the bursting point.

Another important feature of the present invention is that the filter due to its design is partially self-cleaning. As the filter bag 35 expands and contracts due to internal pressure variations within the silo, particulate material and fines trapped within the voids in bag 35 will be caused to be loosened and will fall back into the interior of the silo. The retainer 24 cooperates with the natural operational cycling of the bag to shake the bag clean. Thus the cylindrical member 24 serves as a retainer to prevent overexpansion of the bag as well as provides a barrier which the expanding bag contacts to assist in shaking the bag free of clogging, particulate material.

Although the present invention has been described in detail with reference to a single embodiment, it will be understood that other changes and modifications will be apparent to those skilled in the art without departing from the spirit and scope of the present invention.

I claim:

1. A dust collector for venting silos for storage of pulverulent material comprising:
   an inlet section defining an internal through passageway, means on one end of said inlet section for connection to a vent opening in a silo, flange rim means on the other end of said inlet section;
   a filter section including a generally cylindrical support structure, having an upper and lower end, and flange rim means on the ends of said support structure, one of said flange rim means on said support structure contacting said flange rim means on said inlet section;
   cover means enclosing the upper end of said support structure, a generally cylindrical filter bag having an upper and lower edge, said bag internally sleeved within said support structure and in intimate contact therein in an unpressurized condition, C-clamps attaching said flange rim means on said inlet section and support structure- respectively to said support structure and said cover, whereby dust laden venting air will cause said bag to contact the interior of said support thereby trapping dust therein without bag overexpansion; and shield means associated with said filter section to prevent moisture from entering said filter.

2. The dust collector of claim 1 wherein said filter bag is secured having said upper edge clamped between said cover and said upper support flange rims and said lower bag edge clamped between said inlet and said lower support flange rims.

3. A dust collector for venting silos for storage of pulverulent material comprising:
   a frusto-conical inlet section defining a through passageway, the smaller end of said frusto-conical section adapted for connection at a vent opening in a silo and the larger end having a peripheral flange;

a filter section internally communicating with said inlet section, said filter section including a generally cylindrical expanded metal support structure having a top and bottom end and a rim associated at each of said ends;
   a cylindrical filter bag internally sleeved in said support structure having upper and lower edges lapping said top and bottom rims;
   a cover member adapter to enclose said support's top end;
   releasable clamp means respectively securing said cover and said upper bag edge to the rim of said top end of said support, and securing said lower bag edge and said rim of said support's bottom end to said flange of said inlet section; and weather shield means in the form of a cylinder having a closed upper end, said shield having a diameter exceeding the diameter of said support structure and defining an annular passageway therewith, the inner side of said shield's upper end disposed adjacent the outer side of said cover wherein venting air can pass from said silo through said inlet, filter bag, support structure and annular passageway to atmosphere and whereby said bag will be caused to contact said support upon pressurization thereby restraining and cleaning said bag.

4. The dust collector of claim 3 further including fastener means for securing said shield to said cover.

* * * * *